Sept. 20, 1960 D. M. RUGGLES 2,953,696

PIEZOELECTRIC CRYSTAL UNIT

Filed April 29, 1957

INVENTOR
D. M. RUGGLES
BY Walter M. Hill
ATTORNEY 2,953,696
Patented Sept. 20, 1960

2,953,696

PIEZOELECTRIC CRYSTAL UNIT

David M. Ruggles, Mount Tabor, N.J., assignor to Bell Telephone Laboratories, Incorporated, New York, N.Y., a corporation of New York Filed Apr. 29, 1957, Ser. No. 655,702
4 Claims. (Cl. 310—9.1)

This invention relates to piezoelectric crystal units and more particularly to a crystal mounting assembly.

A piezoelectric crystal unit that is intended to serve as a primary frequency standard must, in addition to including a precisely dimensioned crystal, be mounted in a manner such that the crystal is subjected to environmental conditions that are controlled as much as possible.. Thus for example it is desirable that the crystal mounting have a low mechanical impedance and at the same time a sufficient rigidity that the crystal unit, when subjected to mechanical shock or other externally applied vibration, will not change its characteristics as an oscillator. It is likewise desirable that the crystal be mounted in an evacuated, hermetically sealed container and that the hermetic seal be maintained for extensive periods of time.

In addition to the above, it is necessary for many applications, such as in mobile craft equipment, that the crystal unit be of light weight and miniaturized as much as possible.

Accordingly, it is the general object of this invention to improve the performance of piezoelectric crystal units and to prevent any deterioration of this performance due to external environmental conditions.

Other more specific objects of this invention are to insure a hermetic seal for the crystal unit over extended periods of time; to prevent the crystal vibrations from being transmitted to and through the crystal support; to permit a ready processing of the crystal after the same is mounted upon the support; and to provide a lightweight yet rugged crystal supporting structure which is readily fabricated and inexpensive and easy to assemble.

In accordance with one illustrative embodiment of this invention a piezoelectric crystal designed to vibrate in the length-thickness flexure mode is mounted between and to a pair of electrically conductive channel supports and a single insulator extends between the supports adjacent each of the ends thereof. In addition to providing an extremely rugged yet lightweight structure, the channels serve as a recess to receive nodal solder weights which may necessarily be used to reduce dissipation of the mechanical energy of the crystal. One of the channels may also be advantageously used to readily mount, by a simple crimping operation, an ionization test electrode.

One feature of this crystal mounting structure lies in the improved hermetic seal that can be obtained therewith. It has generally been the practice heretofore to use the lead-in conductors as supporting rods for the crystal, and in so doing, it is necessary that the conductors be of sufficient thickness to rigidly support the crystal. By means of the present structure, however, rigid support for the crystal can be obtained and yet extremely thin lead-in conductors may be used. Thus the ratio of the seal length to the lead-in conductor diameter is increased and the unit is less vulnerable to leakage around the lead-in conductors.

An additional feature of an embodiment of the invention is realized in mounting the longer length, low frequency crystals. In this embodiment the single insulators, extending between the supports adjacent each of the ends thereof, are provided with apertures to permit the crystal to extend therethrough. In this manner the crystal may readily be brought to frequency, by grinding each of the ends, after it has been mounted on said supports. Heretofore while provision was made to grind one crystal end, it was generally difficult to grind the opposite end because the base, through which the lead-in supporting conductors were brought, interfered therewith. In this embodiment, the crystal is easily brought to frequency while mounted upon the supporting structure and thereafter the base is secured in position.

For a clearer understanding of the nature of this invention and the additional advantages, features and objects thereof, reference is made to the following detailed description taken in connection with the accompanying drawings in which.

Figure 1:
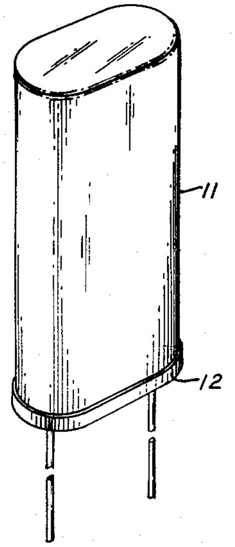
Fig. 1 is a view in perspective of the miniaturized crystal unit of this invention with the metallic container mounted in position upon the base.

Referring now to Fig. 1 of the drawings, a piezoelectric crystal unit in accordance with this invention is mounted within a metallic container or can 11 and the latter is soldered to the base 12. The container 11 is provided with a breather hole (not shown) for the purpose of evacuating the container after the soldering operation, this evacuation being carried out in a conventional and well known manner.

Figure 2:
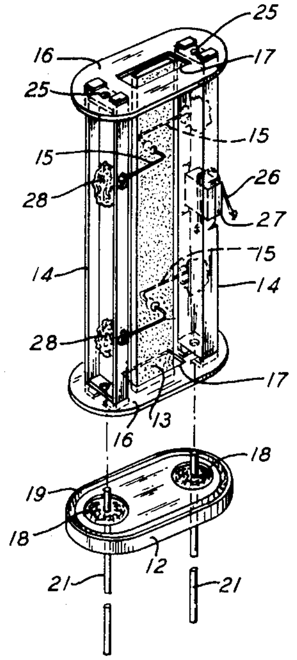
Fig. 2 is a perspective view of a piezoelectric crystal unit in accordance with this invention with the container removed and the base separated from the crystal support structure.

The crystal and mounting structure, as illustrated in Fig. 2, comprises a crystal 13 mounted between and to a pair of upright, electrically conductive, channel supports 14. The crystal may comprise a pair of quartz crystal plates bonded together such that they will vibrate in the length-thickness flexure mode. Thin supporting wires 15, of a diameter of a few mils, are secured to the crystal at the nodal points by conventional means, such as soldering to silver paste spots or by special adhesive attachments. The connection may also be made by the use of the headed wire technique when it is desired to secure a greater contact area with the crystal. The wires 15 are also attached to the channels 14 by means of soldering or the like. Channels 14 may be made of any readily formed, substantially rigid supporting material having good electrical conductivity, such as nickel or beryllium-copper, and they can be fabricated by a simple stamping operation. A single epoxy resin insulator 16 extends between the channel supports adjacent each of the ends thereof, and as shown in Fig. 2 each is provided with a centrally disposed aperture 17, for a purpose to be described.

The base 12 is provided with a pair of insulating eyelets 18 and a peripheral moat 19 which receives the lower edge of the container 11 for the final soldering operation. Thin lead-in conductors 21, of the order of twenty to thirty mils in diameter, are secured in the insulating eyelets 18 and extend therebeyond for a short distance.

Figure 4A:
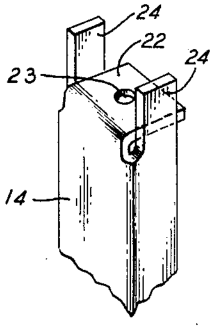
Figs. 4*a* to 4*d* are views of alternative channel supports that may be used in the mounting structure of this invention.
Figure 4B:
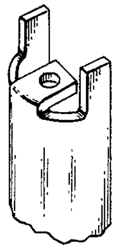
Figure 4C:
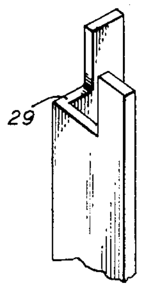
Figure 4D:
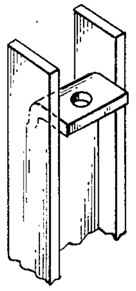

In Fig. 4*a* there is an enlarged showing of the end structure of the channel supports 14 prior to attachment to the insulators 16. The channel is stamped to provide an inwardly extending flange portion 22, having a hole 23, and a pair of end tabs 24. In attaching an insulator to this end structure, the tabs 24 are projected through apertures provided in the insulator until the flange 22 abuts the adjacent surface of the insulator and then the tabs are folded inwardly toward each other as shown in Fig. 2. The insulator is provided with a hole 25 which, after assembly, is aligned with the hole 23 in the flange portion. The insulator is thus fixedly held between portions of the channel support and accordingly there is provided a sturdy structure. In the crystal mounting structures heretofore used there was difficulty in rigidly securing the insulators to the round supporting rods and generally it was found necessary to mount grommets in apertures provided in the insulators and then solder the supporting rods to these grommets. Not only is the presently devised structure easier to fabricate and assemble but it is also more capable of resisting torsional forces. It has been found that in the process of placing the crystal unit in the container, forces may be induced in the mounting structure tending to twist the same about its longitudinal axis. This of course may result in strain on the crystal which can affect its operation.

In addition, the channels are, in and of themselves, a sturdier supporting means than the priorly used round supporting rods and yet they are of lighter weight. This weight factor may be very important in certain applications, such as in mobile craft equipment.

It is generally known in the art to secure a wire electrode to one of the electrically conductive supports near the lower end thereof and then space the end of this electrode a predetermined finite distance from the metallic base, whereby an ionization test can be conducted to measure the effectiveness of the hermetic seal and the extent of leakage, if any. This mounting of the electrode is not entirely satisfactory for it frequently happens that some of the solder used in attaching the can to the base flows over the base in the vicinity of the test electrode and either shorts the electrode to the base or alters the predetermined set distance.

In accordance with this invention, an alternative manner of mounting the test electrode is herein provided which, in addition to being easier to fabricate, overcomes the above noted disadvantages. As shown in Fig. 2, the wire electrode 26 is secured in an insulator block 27 and the latter is seated in the channel and held in this position by simply crimping the sides of the channel. After a slight adjustment, if necessary, an ionization gap will be provided between the inner leg of the electrode 26 and the adjacent inner surface of the channel. The outer leg of the electrode contacts the inner surface of the can when the can is slipped over the crystal and mounting structure, the ionization test potential then being applied between the lead-in conductors and the can.

To reduce damping and to improve the Q of the crystal, it is a known practice to load excess solder on the crystal supports at those points where the resilient wires 15 are secured thereto. In the pre-existing support structures it was always a difficult problem to load any extensive amount of solder on the outer round surface of the support. However, in the present instance the channels provide a ready receptacle for the nodal solder weights. As shown in Fig. 2 the solder 28 can be piled up inside the channels at the desired points and there is for present purposes no limitation on the amount of solder than can be so deposited.

In assembling the crystal unit of this invention, the channel supports and insulators are first secured together as above described and then the resilient wires and the crystal attached thereto are connected to the channels. At this stage the crystal is brought to the precise frequency by grinding the ends thereof. This step can be readily carried out with the structure of Fig. 2 for the insulators 16 are, as mentioned previously, provided with apertures 17 through which the crystal projects. Thus both crystal ends are readily accessible and this further processing is easily carried out. Heretofore, the miniaturized, hermetically sealed units used the lead-in conductors as the crystal supports, and, while provision was made to permit the grinding of the uppermost crystal end, when it came to grinding the lower end, the solid base secured to the lead-in conductors interfered therewith. From a processing standpoint it is necessary that the lead-in conductors be sealed in the insulating eyelets of the base prior to the assembling of the rest of the unit.

With the crystal brought to the precise frequency, the base is mounted in position by projecting the inwardly extending ends of the lead-in conductors 21 through the holes 25 and 23 and then soldering the conductors to the channels 14. The can 11 is next soldered to the base and then evacuated in a known manner.

A further aspect of this invention lies in the fact that thin lead-in conductors may be utilized. When the lead-in conductors are also used as the supporting rods for the crystal, it is necessary that they be of sufficient thickness to adequately support the crystal. However, this results in a ratio of seal length (transverse of the insulating eyelet) to lead-in conductor diameter which is approximately one, and the lower this ratio of seal length to diameter the more susceptible is the unit to leakage around the lead-in conductors. While the base thickness may be increased to increase this ratio, this results in added weight and a slightly larger unit. In accordance with this invention, the crystal can be rigidly supported by the channels and yet extremely thin lead-in conductors, of the order of twenty to thirty mils, can be used, thereby increasing said ratio and insuring a better seal over extended periods.

Figure 3:
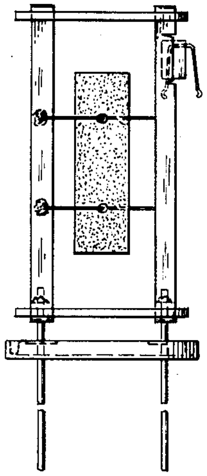
Fig. 3 is a front view of an embodiment of this invention wherein the crystal length is reduced for higher frequency operation.

In the modification of Fig. 3, the same supporting structure as shown in Fig. 2 is used, but the crystal is of shorter length for higher frequency operation. In this modification it is immaterial whether the insulators are provided with apertures 17 for there is sufficient room between the ends of the crystal and the insulators to permit further processing. It will be noted further that the test electrode-insulator block assembly is mounted at a different position along the longitudinal axis of the channel support. The exact positioning of this assembly is immaterial so long as an ionization gap of selected set distance is provided.

Figs. *4a–4d* illustrate alternative types of channel supports than can be used in the mounting structure of this invention. Thus it should be clear that the term "channel" is used in its broad sense to cover the various types of structural supports, such as those depicted in Figs. *4a–4d*. While the support of Fig. *4c* is not provided with an inwardly turned flange portion such as flange 22, of Fig. *4a*, the flat right angle surface 29 abuts the insulator and serves the same purpose as a flange.

With the alternative channel supports such as illustrated in Figs. *4b* and *4c*, it would be necessary of course to shape the insulator block 27 so that the same can be readily seated in the channel.

It should be understood, of course, that the foregoing disclosure relates to only preferred embodiments of the invention and that numerous modifications of alterations may be made therein without departing from the spirit and scope of the invention.

What is claimed is:

1. A crystal unit comprising a pair of electrically conductive channel supports, a piezoelectric crystal mounted between and to said channel supports, a single insulator extending between and secured to said channel supports adjacent each of the ends thereof, an insulator block secured in one of said channel supports by inwardly bent side portions of the support, and a wire electrode mounted in said insulator block having one end spaced adjacent a surface of the support and the other end extending outwardly from the support.

2. A crystal unit comprising a pair of electrically conductive channel supports, a piezoelectric crystal mounted between and to said channel supports, nodal solder weights located within the channels at points where the crystal is mounted thereto, a single insulator exending between and secured to said channel supports adjacent each of the ends thereof, each of the ends of the channel supports being folded so as to tightly engage the opposite flat surfaces of the insultaor secured thereto, an insulator block secured in one of said channel supports by inwardly bent side portions of the channel support, a wire electrode mounted in said insulator block having one end spaced adjacent a surface of the channel support and the other end extending outwardly from the channel support, and a base having a pair of thin lead-in conductors hermetically sealed in said base and extending therethrough, the ends of said conductors being secured to ends of said pair of channel supports.

3. A crystal unit comprising a pair of electrically conductive channel supports, a piezoelectric crystal mounted between and to said channel supports, a single insulator extending between and secured to said channel supports adjacent each of the ends thereof, each insulator having an aperture to permit the crystal to extend therethrough to expose the ends thereof so that the crystal may be readily brought to frequency after it has been mounted to said channel supports, an insulator block secured in one of said channel supports by inwardly bent side portions of the support, and a wire electrode mounted in said insulator block having one end spaced adjacent a surface of the support and the other end extending outwardly from the support.

4. A crystal unit comprising a pair of electrically conductive channel supports, a piezoelectric crystal mounted between and to said channel supports, nodal solder weights located within the channels at points where the crystal is mounted thereto, a single insulator extending between and secured to said channel supports adjacent each of the ends thereof, each of the ends of the channel supports being folded so as to tightly engage the opposite flat surfaces of the insulator secured thereto, each insulator having an aperture to permit the crystal to extend therethrough to expose the ends thereof so that the crystal may be readily brought to frequency after it has been mounted to said channel supports, an insulator block secured in one of said channel supports by inwardly bent side portions of the channel support, a wire electrode mounted in said insulator block having one end spaced adjacent a surface of the channel support and the other end extending outwardly from the channel support, and a base having a pair of thin lead-in conductors hermetically sealed in said base and extending therethrough, the ends of said conductors being secured to ends of said pair of channel supports.

References Cited in the file of this patent

UNITED STATES PATENTS

| | | |
|---|---|---|
| 2,518,861 | Butch | Aug. 15, 1950 |
| 2,549,551 | Walsh | Apr. 17, 1951 |
| 2,644,904 | Barry et al. | July 7, 1953 |
| 2,660,680 | Koerner | Aug. 9, 1953 |
| 2,677,775 | Font | May 4, 1954 |
| 2,821,651 | Werner | Jan. 28, 1958 |